Figure 1:
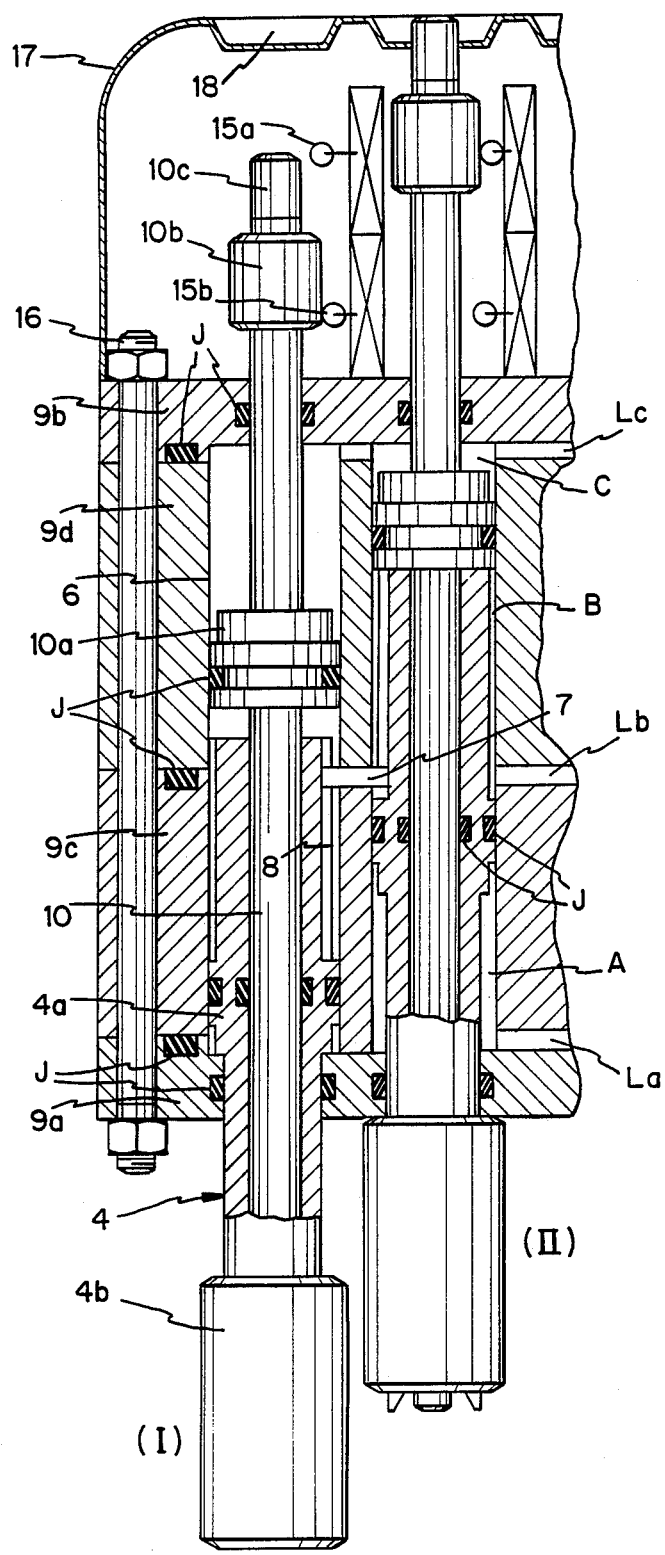

United States Patent [19]

Blum

[11] Patent Number: 4,734,251

[45] Date of Patent: Mar. 29, 1988

[54] MULTI-GRIPPER HANDLING APPARATUS WITH INDIVIDUAL FORCE LIMITER

[75] Inventor: Paul Blum, Saint-Nom-La-Bretèche, France

[73] Assignee: Transnucleaire, Paris, France

[21] Appl. No.: 5,891

[22] Filed: Jan. 22, 1987

[30] Foreign Application Priority Data

Jan. 22, 1986 [FR] France ............................. 86 01268

[51] Int. Cl.$^4$ ............................................. G21C 19/32
[52] U.S. Cl. ..................................... 376/261; 294/906; 279/4
[58] Field of Search ............... 376/261, 271, 268, 264; 294/906, 88, 86.15, 87.1; 414/146, 736, 739, 753; 901/37; 279/4

[56] References Cited

U.S. PATENT DOCUMENTS

| | | | |
|---|---|---|---|
| 2,561,536 | 7/1951 | Rowe | 294/88 |
| 3,733,250 | 5/1973 | Van Santen et al. | 376/264 |
| 4,374,801 | 2/1983 | Albin | 376/271 |
| 4,482,520 | 11/1984 | Randazza | 376/261 |
| 4,487,741 | 12/1984 | Vuckovich et al. | 376/271 |
| 4,539,174 | 9/1985 | Patenaude | 376/261 |
| 4,550,941 | 11/1985 | Veronesi et al. | 294/906 |
| 4,551,299 | 11/1985 | Shields | 376/261 |
| 4,682,920 | 7/1987 | Rodgers | 279/4 |
| 4,687,245 | 8/1987 | Formanek | 376/261 |

FOREIGN PATENT DOCUMENTS 2623103 12/1977 Fed. Rep. of Germany ...... 376/271

Primary Examiner—Deborah L. Kyle
Assistant Examiner—Daniel Wasil
Attorney, Agent, or Firm—Dennison, Meserole, Pollack & Scheiner

[57] ABSTRACT

A handling apparatus which is intended primarily for operations involving pulling and pushing nuclear fuel rods which are carried out when dismantling assemblies, comprising a handling head in which there are provided a plurality of cylinders (6) in which grippers are slidable, formed by two coaxial parts (4, 10) by means of pistons (4a, 4b) which are fixed with respect thereto. Said pistons define three annular spaces (A, B, C) which are supplied by three individually controllable hydraulic fluid circutis (La, Lb, Lc). Such fluids provide for opening and sliding movement of the grippers with respect to the head as well as control of the maximum admissible force in respect of traction or compression on the grippers.

At the upper end of each gripper two travel limit switches give the individual situation of each thereof.

4 Claims, 1 Drawing Figure

MULTI-GRIPPER HANDLING APPARATUS WITH INDIVIDUAL FORCE LIMITER

TECHNICAL FIELD

The present invention concerns an apparatus which can be used primarily for handling an assembly of nuclear fuel rods. The apparatus is formed by a handling head comprising a plurality of individual grippers which are each intended simultaneously to grip a fuel rod by way of one of the ends thereof, each of the grippers comprising a force limiting device (traction or pushing force) and a device for indicating the situation thereof.

STATE OF THE ART

Nuclear fuel assemblies are formed by fuel rods in the form of cylindrical bars of a diameter ranging from 5 to 15 mm and of substantial length (which can exceed 4 meters). The rods are disposed in a grid configuration with a pitch of the order of 1.5 times their diameter. The grid is formed by:

two end members connected by bracer members which occupy certain junctions or nodes of the grid arrangement and which are fixed to the end members by welding, crimping or screwing. The bracer members may be formed either by tubes into which can be introduced control rods (which is the case with fuel assemblies for a PWR boiler), or rods with screwthreaded ends (which is the case with fuel assemblies for a BWR boiler). The rods are disposed between the bracer members;

intermediate plates or grills which are perpendicular to the rods and which are apertured with the same pitch as the grid arrangement, being fixed to the bracer members and thus providing for the spacing between the fuel rods which occupy all the other junctions or nodes of the grid system.

The fuel rods which are usually formed by discs of fuel material which are surrounded with a metal casing which ensures that the rod is sealed and rigid, are held in their grid configuration by the intermediate plates or grills and can slide axially until they butt against one of the end members.

In the course of manufacture or dismantling of the fuel assemblies, it may be necessary to handle the rods in clusters or bunches, which makes it necessary to use heads having multiple grippers for gripping the rods at one of the ends thereof. The number of rods which are handled simultaneously in that way may be 264 or higher.

By virtue of their highly elongate geometrical configuration, the rods are relatively fragile and deformable, and such defects may be made worse after irradiation; it is therefore necessary to carry out the handling operations with care in order to avoid rupturing or buckling the metal sheath.

It is in particular in the course of an operation of dismantling the fuel assemblies that the rods are subjected to the highest level of stresses: in a first phase, operation generally begins by dismantling and separating one of the end members from the bracer members, then, holding the intermediate grids, the rods are removed, generally several rods at a time. Having regard to the possible deformation to which the rods have been subjected in the course of irradiation, and the possibility that they can slide axially until they come to bear against an end member of the fuel assembly, it may happen that the ends thereof are no longer aligned and that the force for removal thereof varies considerably from one rod to another and even attains an excessive value for one or more of the rods, giving rise to the risk of causing rupture thereof.

For example, in regard to an assembly formed by 264 rods of a diameter of 9.5 mm, forming a square grid system of $17 \times 17$ with a grid pitch of 12.5 mm, the level of the ends of the rods may vary by $\pm 2$ cm around a mean value and the force required for removing a rod may vary from 30 N to more than 500 N, the critical force at which there may be a fear of causing rupture of the rod being of the order of 800 N in this case.

After extraction, the rods are stored in a compact arrangement in containers by means of a storage system. In that operation which may be carried out by pushing the rods into the system, there may be a fear that the deformation to which one of the rods has been subjected in the course of irradiation may give rise to the generation of an excessive force with the danger of causing it to suffer from buckling under the thrust force of the handling apparatus.

The operation of handling the rods is generally carried out by means of a handling head comprising a plurality of individual gripping devices or grippers corresponding to all or some of the fuel rods to be extracted; an assembly can thus be dismantled in a number of successive operations, in order to limit the number of rods handled at a time. Usually, the rods are gripped by grippers which grip them by means of metal jaws or by way of rubberised material; as the grippers are usually fixed with respect to the handling head by a rigid connection to permit pulling and pushing movements, the force transmitted by the handling head is distributed among the various rods in dependence on the particular resistance to traction force or thrust force of each thereof, and one of the rods may rupture or buckle without an abnormal force being perceptible at the location of the handling head.

The object of the present invention is to avoid the abovementioned danger of rupture which may compromise the safety aspect in regard to the handling of radioactive materials. In other words, the apparatus that the invention seeks to provide must make it possible never to exceed the rupture limit on each of the rods being handled in the operation of dismantling the fuel assemblies or in the operation of subsequently rearranging and compacting them, while also making it possible to regulate that limit value, while permitting the rod or rods which are the cause of the defect to be particularised.

Moreover, the individual apparatus that the invention seeks to provide must comply with two other requirements: it must not be bulky since it must be positioned within the compact grid system defined by the rods, and it must be remotely operable.

DESCRIPTION OF THE INVENTION

The present invention lies in an apparatus which is intended primarily for lifting, pulling, pushing and performing various handling operations in respect of multiple loads; it is formed by a handling head comprising a plurality of self-gripping grippers which are disposed in accordance with a grid mesh configuration which may be particularly tight and which are remote-controlled by a fluid which may or may not be hydraulic (for example compressed air); it makes it possible to limit the traction or thrust force transmitted to the load, to locate individually the load at which an excess of force is occurring, in consequence of that indication possibly to carry out all safety or other pertinent operations, and to accommodate the effects of inertia without causing damage to the loads; it is characterised in that:

said handling head which is composed of one or more parts forming a block comprises a plurality of cylinders which open to the exterior by way of openings, of smaller diameter than the diameter of the cylinder, by way of which emerge the ends of the grippers and the ducts for the supply of operating fluid (which may or may not be hydraulic);

said self-gripping grippers comprise two coaxial parts which are movable axially one within the other, themselves being slidable axially within said cylinders by means of coaxial pistons fixed on said two parts: said two parts are extended by two end portions opening to the exterior of the handling head, the lower end portion being provided with a gripping device actuated by the two parts, and the upper end portion being provided with a cam;

said coaxial pistons delimit within the cylinders three annular compartments which are each supplied by three systems of operating fluid at controllable pressure, serving to control the opening of the grippers, to control the movements between the raised and lowered positions of the grippers, and to obtain and control the pressure corresponding to the maximum admissible traction or thrust force on the grippers; and travel limit switches are positioned in the vicinity of each gripper so as to be operable by said cams.

The apparatus according to the invention is particularly well suited to operations for extracting and storing fuel rods, which are carried out when dismantling fuel assemblies, and will be more clearly apparent from the description of the particular embodiment for that use. It is illustrated in FIG. 1 which shows a view in section of the manipulation apparatus, showing only two grippers, one in the lowered and open position (I) and the other in the raised and closed position (II).

It will be seen that the handling head in this particular embodiment is formed by four parts 9a, 9b, 9c and 9d which are assembled by way of seals J and tie rods 16, but it could also be in one piece; provided in the parts 9c and 9d are identical cylinders 6 in which the self-gripping grippers will slide, and conduits for the supply of fluids under pressure, which can be regulated separately, as at La, Lb and Lc; disposed in the parts 9a and 9b serving as covers for the cylinders are openings whose diameters are smaller than those of the cylinders, by way of which the ends of the grippers will emerge. The head may be protected by a casing 17 in which openings 18 correspond to the positioning of the grippers.

The self-gripping grippers are formed by two coaxial parts 4 and 10 which are slidable one within the other. The bottom end 4b of each thereof projects from the handling head. Disposed at that end is the self-gripping gripping device for the fuel rods, which device is not described and may be of different types, comprising jaws, rollers, etc, and which is opened or closed by the relative movement of the two parts 4 and 10. In the particular embodiment illustrated, the gripper is closed when the piston 10a is in contact with the upper end of the part 4, and opened when they are spaced from each other; in addition a return spring disposed in the end 4b of the gripper tends to hold it in a closed condition.

The outer part 4 which forms a sheath is slidable within the cylinder 6 by way of a coaxial piston 4a which is fixed with respect thereto and which can come into a position of lower abutment against the closure plate 9a, and delimits a sealed internal annular space A of variable volume which is supplied with fluid by way of the conduit La. A longitudinal groove 8 may be provided on the sheath 4, and a pin 7 which is fixed in the body of the handling head engages into the longitudinal groove 8, so as to ensure that the gripper is in a position of constant orientation.

Likewise the central part 10 of the gripper passes through the whole of the sheath 4 in which it is slidable sealingly (by means of a seal) and emerges in the upper part of the head, also in a sealed manner, by way of an opening provided in the plate 9b. It is slidable in the bore 6 by means of a coaxial piston 10a which is fixed with respect thereto and which can come into a position of upper abutment against the closure plate 9b and which defines an upper sealed annular space C of variable volume which is supplied with fluid by way of the conduit Lc. Another intermediate sealed annular space B of variable volume is provided between the pistons 10a and 4a and is supplied with fluid by way of a conduit Lb. The annular spaces of the same category A, B or C are connected together and each assembly is connected to an external apparatus for putting the fluid under pressure. Such apparatuses, of conventional type, are independent of each other and controllable.

Fixed to the upper outwardly extending end portion of the rod 10 are a cam 10b and an eye portion 10c which serves as an engagement mens for possible manipulation of the gripper by mechanical means under remote control.

Disposed on the upper part 9b of the handling head, in the vicinity of each gripper, are two travel limit switches 15a and 15b, of any type, being pneumatic, electromagnetic or otherwise, which can be actuated by the cam 10b and which are connected to tell-tale or signal means and/or servo control systems and/or data transmission systems and/or regulating systems and/or alarm systems, etc.

OPERATING PRINCIPLE

The operating principle of the apparatus is set forth by way of non-limiting example with reference to the particular embodiment illustrated in FIG. 1 in which the self-gripping grippers are such that they are in a closed position when the piston 10a and the top of the sheath 4 are in contact with each other (position II) and it is the end 4b of the sheath 4 which provides for suspending and gripping the rod. With another type of gripper, the process is identical; it is only necessary for the relative values of the fluid pressures in the different annular spaces A, B or C to be correctly distributed in order to provide for the desired movement and control operations.

(a) Extraction of the rods

The operation of gripping and extracting the fuel rods will be described with reference to FIG. 1. The operating sequences are as follows:

1. Downward movement of the grippers into the lowered position and opening of the grippers. The pressures to be applied are as follows:

in A: atmospheric pressure in B: pressure Pb such that it holds the members 4 and 10a disconnected (gripper opened) while counterbalancing the return spring disposed in the lower end portion 4b, which tends to close the gripper.

If the gripper operated in the opposite direction, the pressure Pb would be zero.

in C: slight increased pressure, of the order of $0.5 \cdot 10^5$ Pa.

The grippers are then in the lowered position with 4a in a condition of abutment against 9a, and opened. All the contacts 15b are in position F for example.

2. Downward movement of the handling head until all the grippers are in a condition of abutting against the head of a rod, and the contacts 15b are in position O.

3. Closure of the grippers by releasing the pressure Pb.

4. Producing the pressure corresponding to the limit of the maximum admissible traction force. The compartment C is set to atmospheric pressure and then the compartment A is put under a pressure Pa such that it corresponds to a value of traction force which is lower than the admissible limit on the rods. During that pressurising operation, the grippers, having a tendency to move upwardly, disengage the rods in a first phase, which makes it possible to note in passing the force for disengagement of the rods (if the pressurisation effect is progressive), and they then come into the upward abutment condition, thus operating the switches 15a which move into position F. That makes is possible to check that all the rods have indeed been disengaged and ensure all the heads of the rods are disposed in the same plane.

5. Extraction of the rods: the handling head is moved progressively upwardly; if the resistance to traction of a rod is such that it reaches the pressure Pa, the switch 15a moves into position O, thus transmitting an item of information which makes it possible to locate the rod in question and/or to provide for various operational or safety sequences, such as stopping the upward movement of the head.

Moreover, the gripper may continue its travel movement over a certain length, which makes it possible to accommodate the forces of inertia without the risk of causing rupture of the rod.

Then, if appropriate, it is possible either mechanically to release the rod by pulling on the eye portion 10c, or to increase the pressure Pa, while not exceeding the rupture limit of the rod, or to carry out any other useful operation.

(b) Stowing and storing the rods

The operation involved consists of introducing the rods into a container for compact storage by means of a system for rearranging the rods. The apparatus according to the invention makes it possible to carry out that operation by pushing the rods into said system.

1. Presentation of the lower ends of the rods to the entrance of the rod rearrangement system, which is effected by downward movement of the handling head.

2. Producing the pressure corresponding to the limit of the maximum admissible thrust force and introducting the rods by means of a thrust force into said system: the space A is set to atmospheric pressure and the space C is set to a pressure Pc such that the force applied to the gripper is lower than the admissible limit in respect of compression force on the rods. The switches 15a go into position O and the switches 15b take up position F, which indicates that all the rods are ready to be pushed into their rearrangement housings. The head is progressively lowered; in the event of an abnormal force on a rod, the corresponding switch 15b goes into position O, producing the same kinds of consequences as referred to above in relation to the extraction operation.

3. End of the operation and release of the rods.

When the lower end of a first rod reaches a condition of abutment against the bottom of the storage container, the corresponding switch 15b goes into position O; the pressure in the space C is then restored to atmospheric pressure and the handling head is lowered until all the switches 15b go into position O, and then the pressure Pc is restored in the space C so as to push all the rods to a condition of abutment in the container; the grippers are opened by putting the space B under the pressure Pb and the handling head can then be raised again.

The foregoing example makes it possible to illustrate operation of the apparatus in a particular situation; it may also be used for any kind of lifting or pushing operations or various handling operations (verticl or horizontal) in respect of multiple loads which may or may not require limitation in relation to the force to which the load is subjected, and which may or may not involve monitoring of the individual behaviour of each load. Different types of loads may be processed by adapting the form of the gripping heads and/or the gripping mechanism (not described) which is actuated by the two coaxial elements 4 and 10.

I claim:

1. Handling apparatus for an assembly of nuclear fuel rods comprising a handling head including a plurality of gripper assemblies, each gripper assembly configured to engage and manipulate a single fuel rod, means to control the gripping and thrust forces transmitted to each fuel rod within predetermined parameters to avoid damage to said rods, said handling head further including a block portion with means defining a plurality of cylinders extending therethrough in vertical, parallel orientation, upper and lower plate members extend across the upper and lower surfaces of said block and sealingly secured thereto, passage means within said head and selectively interconnecting said cylinders with sources of pressurized fluid, first and second piston assemblies extending into each cylinder selectively movable between positions within said cylinder and with respect to each other in response to the introduction of pressure fluid through a preselected passage in said head, said first piston assembly including a piston rod extending coaxially through a piston and through both said upper and said lower plate members, said second piston assembly including a coaxial sleeve portion positioned beneath said piston and encircling a portion of said piston rod for relative movement therebetween, said sleeve and said piston rod both reciprocally and coaxially extending through said lower plate member, and gripping means carried by said sleeve and including a plurality of gripping fingers mounted within said gripping means and movable between gripping and non-gripping positions, said fingers being resiliently urged to a gripping position and movable to a non-gripping position by relative movement of said piston rod and said sleeve.

2. Apparatus according to claim 6 wherein the upper end portion of said piston rod includes an eye portion for selective manipulation of the gripper by mechanical means.

3. Apparatus according to claim 6 wherein the handling head includes a protective casing, means defining openings in said casing coaxial with the gripper assemblies.

4. Apparatus according to claim 6 wherein means defining a longitudinal groove and complementary pin interengage in the body of the head and sleeve to orient the respective parts.

* * * * *